United States Patent [19]

Kruessel

[11] Patent Number: 5,009,632

[45] Date of Patent: Apr. 23, 1991

[54] METHOD AND DEVICE FOR JOINING FOIL HOSES

[75] Inventor: Bernhard Kruessel, Halle, Fed. Rep. of Germany

[73] Assignee: Karl H. Sengewald KG, Halle, Fed. Rep. of Germany

[21] Appl. No.: 324,316

[22] Filed: Mar. 16, 1989

[30] Foreign Application Priority Data

Mar. 18, 1988 [DE] Fed. Rep. of Germany ....... 3809125

[51] Int. Cl.$^5$ ............................................. B31B 23/74
[52] U.S. Cl. ................... 493/189; 493/206; 493/209; 53/567
[58] Field of Search .......... 53/567; 493/189, 194–196, 493/198–203, 206, 209, 223, 224, 344, 381, 345, 346

[56] References Cited

U.S. PATENT DOCUMENTS 2,113,636  4/1938  Vogt ................................... 493/193
2,635,670  4/1953  Winberg ............................. 493/346
3,411,419  11/1968  Becker ................................ 493/224
3,680,445  8/1972  Pearl ................................... 493/223

Primary Examiner—Frederick R. Schmidt
Assistant Examiner—Jack Lavinder
Attorney, Agent, or Firm—Spensley Horn Jubas & Lubitz

[57] ABSTRACT

A transverse-welding station [(12)] is provided for joining the hose parts [(11a, 11b)] of foil hoses [(11)] that are welded to bag lengths [(BL)] by transverse welds [(21, 22)]. In this station, the hose parts are superimposed such that the joining weld is laid exactly on the superimposed transverse welds [(22)] of the two hose parts. This results in a joining of the hose ends that does not use adhesive tape and observes the pitch determined by the length of the bags. The invention provides a joining that is practically imperceptible and does not at all impair the quality of the bags made. In particular, the occurrence of single bags that would have to be considered as waste is avoided. The method is applicable for cutting out imperfections from a foil hose, as well as for connecting the beginning of one hose roll to the end of the preceding hose roll.

7 Claims, 3 Drawing Sheets

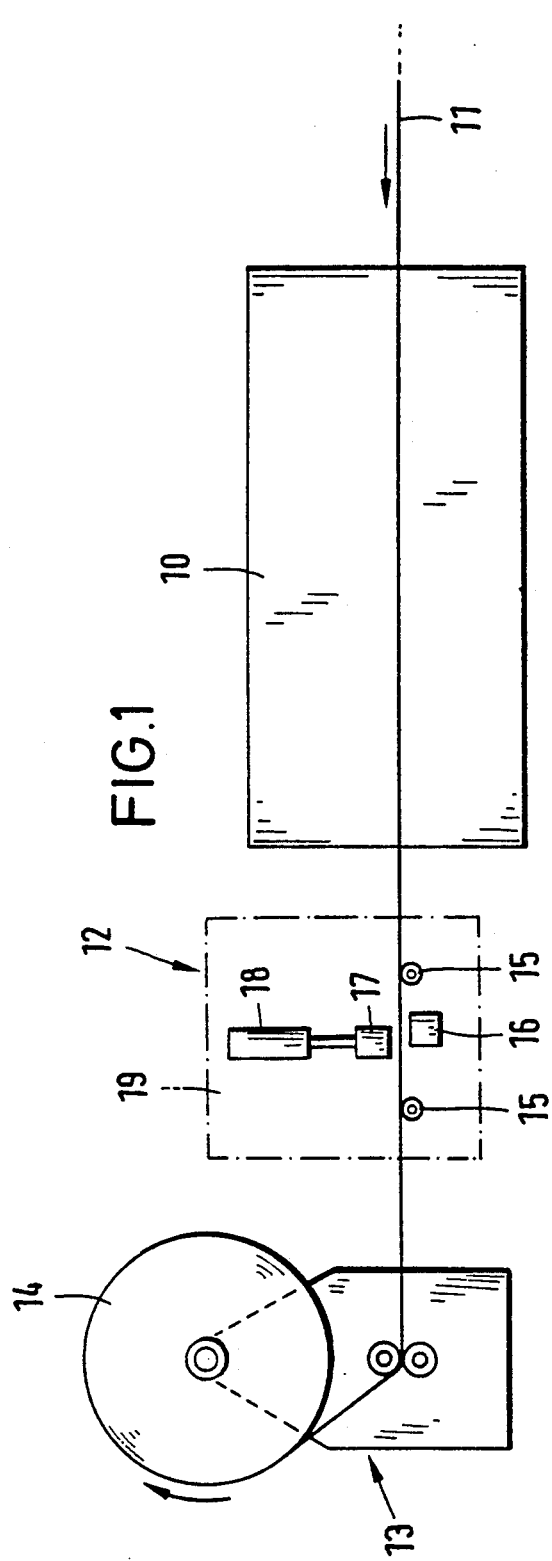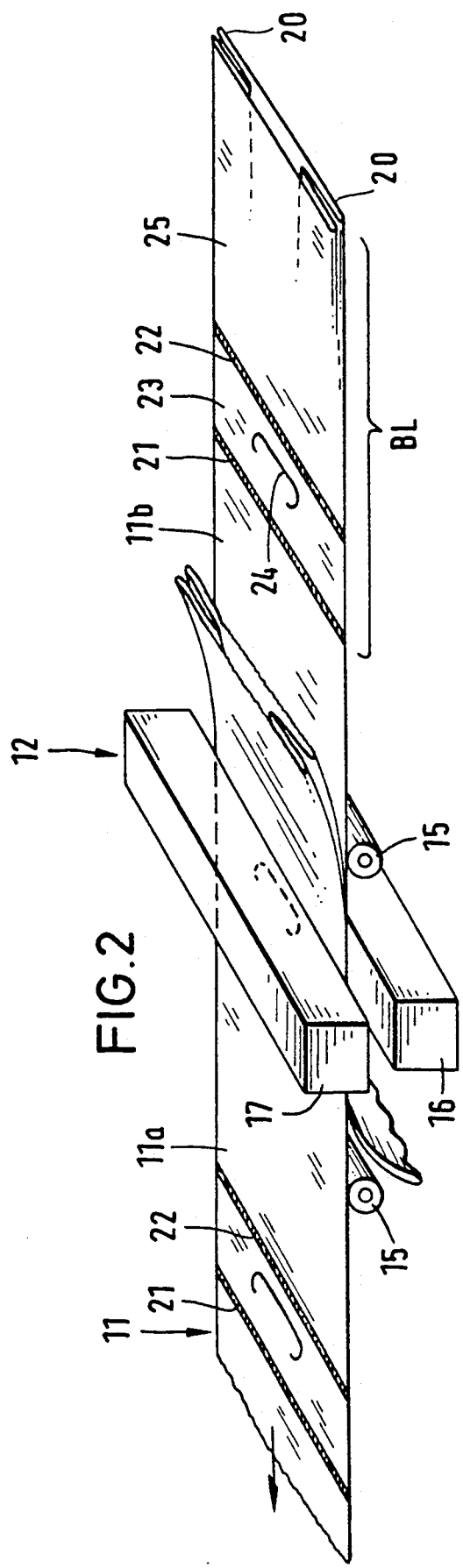

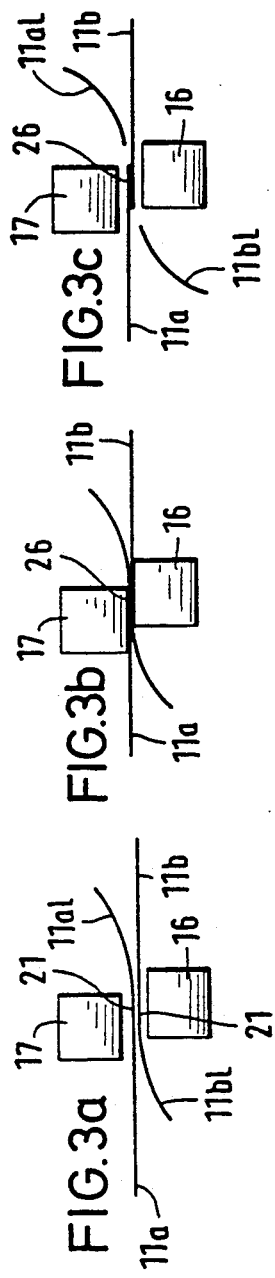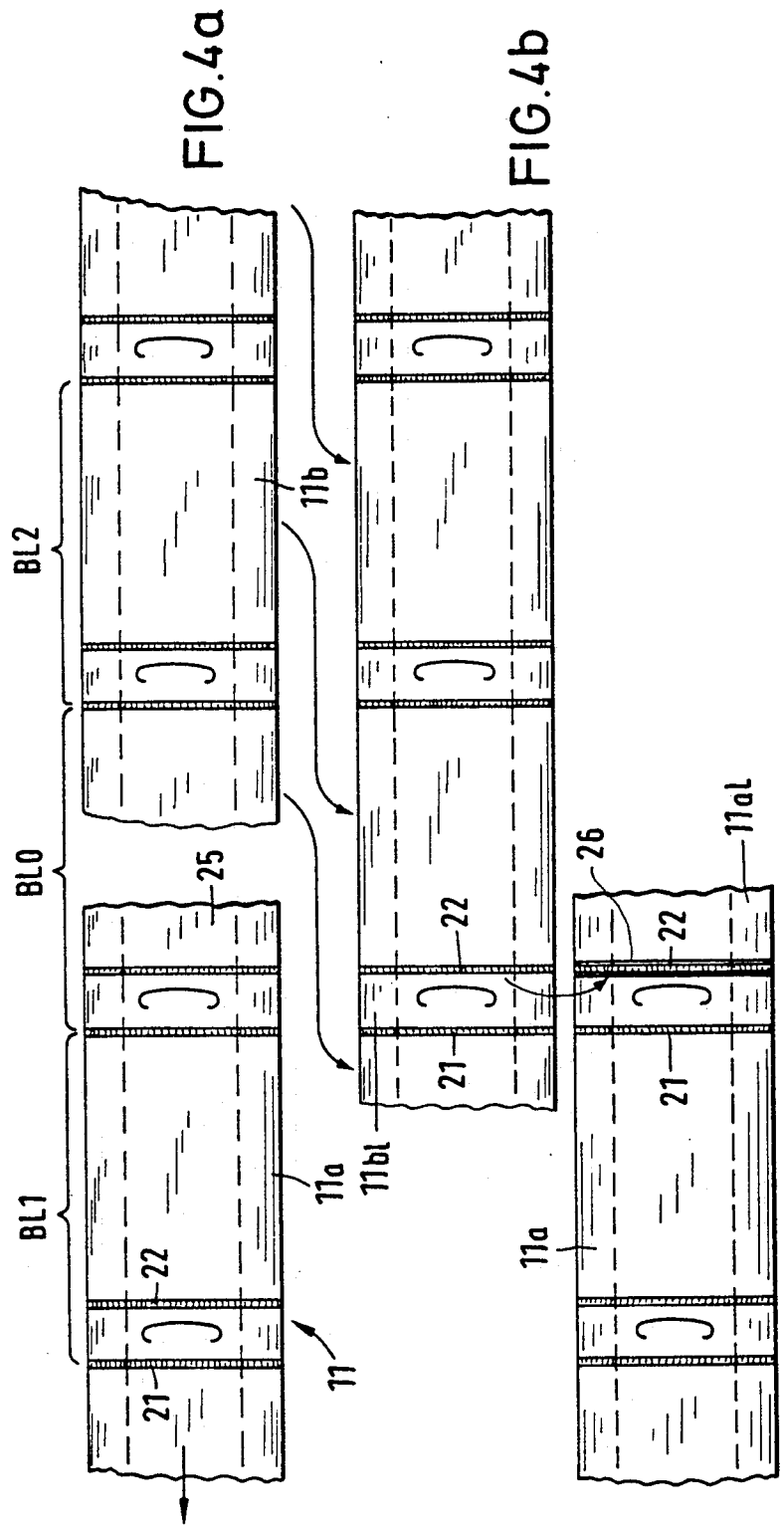

METHOD AND DEVICE FOR JOINING FOIL HOSES

BACKGROUND OF THE INVENTION

1. Field of the Invention

The present invention relates to a method for joining foil hoses that are subdivided in bag portions according to the pitch of the bag length and a device for realizing this method.

It is known to produce packing bags by first making a foil hose that is subsequently printed and subdivided by transverse welds into individual portions forming bags. Afterwards, the foil hose is reeled up by a winding device to form a roll. The separation of the individual bags from the foil hose and the filling of these bags is effected in a filling and closing apparatus fed by the foil hose roll.

Difficulties occur upon the joining of two foil hoses. Such joining is necessary, if the foil hose roll that feeds the filling and closing apparatus is used up and the beginning of a new foil hose roll is to be placed at the end of the old foil hose roll. Another reason for the joining of foil hoses may be that a foil hose shows imperfections that have to be cut out. According to prior art, the joining of foil hoses is achieved by superimposing the respective hose ends with a comparatively large overlapping area and by applying a comparatively wide adhesive tape on both sides of the overlapping foil hoses. Applying these tapes requires considerable skill and comparatively much time. However, it is an even more serious problem that the respective bag portion, in which the joining has taken place, is of lessened quality and has to be subsequently removed from the production line as waste. This is particularly disadvantageous if the bags are fed to a filling and closing apparatus. If the goods to be filled into the bags have to be filled in under sterile conditions, as is true for example with diapers, the bags provided with adhesive tape have to be especially marked. These bags may be filled by the filling and closing apparatus, but they have to be subsequently sorted as waste together with the filling.

It is an object of the invention to provide a method that allows to join or combine foil hoses subdivided into bag portions such that no bag of insufficient quality occurs at the joint and that, in particular, a joining by adhesive tape is avoided.

This object is solved with the features of claim 1.

In the method according the present invention, two corresponding transverse welds of the foil hoses to be joined are superimposed and joined together by means of a joining weld. Thus, the foil hoses are joined at places, that are provided with transverse welds, anyway, i.e., the already existent transverse welds are covered with the joining weld. The joining weld is situated at a place in the pitch of the bag portions that is already provided with a transverse weld. This results in a joint that is practically different from the usual transverse welds. The only difference is that the thickness at the joining weld of the joined foil hose is greater than that at the welds of the simple foil hose; however, this greater thickness is hardly perceptible in the end product, due to the pressure applied during the welding. The method according to the invention allows a simple and rapid joining of foil hoses in the pitch of the bag portions, without impairing the quality of the respective bag portion at the joint. The method may be applied if a foil hose leaves the bag making machine in which the transverse welds for the individual bag portions are provided, and before the foil hose is reeled up to form a roll.

In the case of the foil hose being torn off or showing imperfections, it is possible to join the respective hose ends, so that rolls of a predetermined size can be reeled up at any time, without the roll having bag portions with adhesive tape. Another application of the present method is effected in combination with a filling and closing apparatus to which a foil hose is supplied from a roll. There is the particular possibility of rapidly joining the end of one roll to the beginning of the next roll without any loss in quality. Thus, the troublesome lacing-up of the beginning of the new roll into the filling and closing apparatus that usually requires an overmeasure of about 20 to 25 meters of hose length may be dropped.

The method according to the present invention is particularly suited for the processing of foil hoses for satchel bags with a flat portion of the bag having a grip hole provided between an upper end weld and an intermediate weld. With such satchel bags, the joining welding is performed at the superimposed intermediate welds, i.e., in the central longitudinal part of the bag and not at one of the end welds.

A device for performing the method according to the present invention is provided with a transverse-welding station arranged at a spot, where each transverse weld of the intermittently moved foil hose stops. This allows to draw only one of the foil hoses to be joined up to the transverse-welding station, while the other foil hose is already in the correct position at the transverse-welding station.

The transverse-welding station may be of a very simple configuration. It requires only two welding bars that provide the joining weld over the already existing transverse welds. These welding bars may be simultaneously provided with cutting edges for tearing off the flaps of the joined foil hoses.

A detailed description of preferred embodiments of the invention will be made with reference to the accompanying drawings.

In the Figures

FIG. 1 is a schematic illustration of a bag making machine with a reel,

FIG. 2 is a perspective view of the transverse-welding station,

FIG. 3 shows schematic illustrations of the cycles at the transverse-welding station, FIG. 4 is an illustration of the joining of two foil hose ends and FIG. 5 is a schematic illustration of a filling and closing apparatus being fed with a foil hose to form bags thereof.

Figure 5:
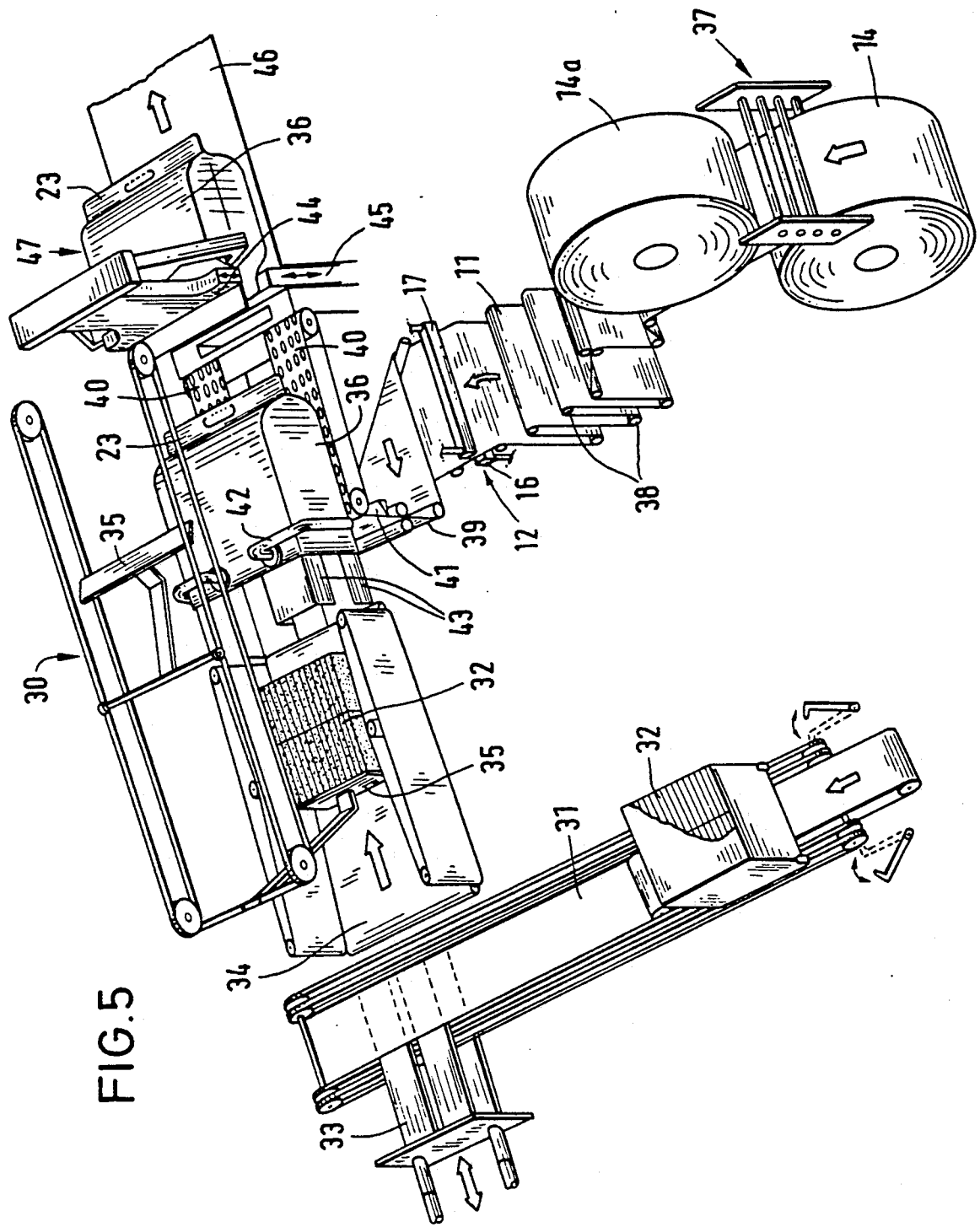

FIG. 1 shows a bag making machine 10 fed with a continuous foil hose 11. The foil hose 11 may be produced, e.g., by a blow film extruder and subsequently provided with a printing corresponding to the length of a bag. The foil hose 11 is intermittently transported through the bag making machine 10 in a flat state in steps corresponding to the length of the bags and is formed into bag portions in said machine by providing transverse welds and by punching out a grip hole. The foil hose 11 then passes the transverse-welding station 12 to be subsequently reeled up by a winding device 13 to form a roll 14. Later, this roll 14 is further processed in the filling and closing apparatus illustrated in FIG. 5.

The transverse-welding station 12 is provided with two support rolls 15 over which the foil hose 11 runs and between which the lower stationary welding bar 16 is disposed. Above the lower welding bar 16, the upper welding bar 17 is arranged that may be vertically moved by a pneumatic drive 18. The foil hose ends to be joined may be held in position by a manually operated hold-down 19, so that they keep a defined position during the welding process.

FIG. 2 is a schematic illustration of the transverse-welding station 12 with the heated welding bars 16 and 17, the foil hose 11 running between them.

In the present embodiment, the foil hose 11 serves for producing satchel bags. It is flattened, forming lateral folds, in which state it is provided with an upper end weld 21 and an intermediate weld 22 for the length BL of each bag. The transversally extending welds 21,22 are produced in the bag making machine 10. The handle portion 23 of the bag is arranged between the upper end weld 21 and the intermediate weld 22. The handle portion 23 remains flattened even when the bag is filled. It is provided with the punched out grip hole 24. Adjacent to the flat handle portion 23 is the filling portion 25 of the bag. Later on, this filling portion is filled with the contents of the bag from the open bottom side and closed subsequently with a transverse bottom weld. In the foil hose 11, one length of a bag BL is immediately followed by the next. Only in the filling and closing apparatus are the lengths of the bags separated, the cut being made above the upper end weld 21. Thus, the rear end of the preceding bag is opened.

Should the foil hose 11, coming from the bag making machine 10, have an imperfection, this imperfection will be cut out. This results in two hose parts 11a and 11b that have to be joined, so that the foil hose is complete again and can be reeled up on the roll 14. The hose parts 11a and 11b are joined at the transverse-welding station 12 by means of welding bars 16 and 17. The two bag lengths to be joined are laid between welding bars 16,17 such that the intermediate welds 22 of both bag lengths exactly rest one upon the other. Then, the transverse-welding device is operated, providing the joining weld 26 that joins hose parts 11a and 11b in accurate correspondance with the pitch, i.e., according to the length of a bag. This manner of joining is schematically illustrated in FIG. 3. FIG. 3a shows the state in which the end welds 21 of both hose parts 11a and 11b are laid between welding bars 16, 17. The welding bars are in staggered arrangement with regard to the lengthwise extension of the foil hose, so that during the welding operation illustrated in FIG. 3b, the joining weld 26 is provided but in the overlapping portion of welding bars 16 and 17. FIG. 3b also illustrates the flaps 11al and 11bl of hose parts 11a and 11b. Immediately after the joining weld 26 has been provided, these flaps are manually torn off along the edges of welding bars 16 and 17 acting as cutting edges. FIG. 3c illustrates the state of the foil after flaps 11al and 11bl have been torn off. It can be seen that the joining weld 26 only forms a narrow overlapping portion of the hose parts 11a and 11b, without any remaining flaps existing at that joining weld. After the joining of hose parts 11a and 11b, the operation of the bag making machine 10 and the reeling up on the roll 14 may be continued.

FIG. 4a shows the foil hose 11 after leaving the bag making machine 10. It may be supposed that the foil hose 11 has the defect bag length BL0 that has to be cut out of the hose. The preceding intact bag length is denoted as BL1 and the following bag length as BL2. It is further supposed that the imperfection lies within the filling portion 25 of the bag length BL0.

For joning hose part 11a and hose part 11b, the intermediate weld 22 of bag length BL2 is laid on the intermediate weld 22 of bag length BL0 and both intermediate welds are joined by the superimposed joining weld 26. Subsequently, flaps 11al and 11bl are torn off as illustrated in FIG. 3c. In FIG. 4b, the hose parts are shown side by side for better understanding. In reality, hose parts 11a and 11b are superimposed. The joining of the parts at the intermediate welds has the advantage that the end welds are not modified, so that the wider joining weld does not impair the cutting off of the bag length.

FIG. 5 shows the filling and closing apparatus 30 for the satchel bags described above. This machine comprises a feeder 31 by which the charge 32 to be fed into the bags, e.g., packs of diapers, is supplied. A pushing device 33 shifts the charge 32 from the feeder 31 onto a chute 34, on which the charge is pushed into the open bag 36 by a further pushing device 35.

The bags 36 are made from the foil hose 11 by cutting them off close above the upper end weld 21. The foil hose 11 is drawn off the roll 14 by an unwinder 37. The drawing shows a further roll 14a, the beginning of which is connected to the end of roll 14, when roll 14 is used up. To compensate tensile stresses, the foil hose 11 runs over several jockey rollers 38 in order to subsequently pass through the transverse-welding station that is arranged in the same way as the transverse-welding station of FIGS. 2 and 3. Then, the foil hose 11 passes a turning station 39 to be finally put on suction belts 40 provided in the bottom of the transport path of the charge 32. A cutting device 41 is disposed in front of the suction belts 40, which cuts the individual bags 36 off the foil hose 11 directly above each end weld 21, so that the lower end of the preceding bag is open. While the underside of the bag 36 is held by the suction belts 40, suction arms 42 take hold of the upper side of the bag 36 to open it. Subsequently, spreaders 43 enter into the opened lower part of the bag 36. The spreaders 43 simultaneously serve as guiding elements for inserting the charge 32 into the opened bag 36. The bag being thus filled, the suction belts 40 are driven to move the bag 36 from the filling position to the closing position 47, where the bottom weld of the bag 36 is provided by means of welding bars 44 and 45. The filled bag 36 is then transported away by the conveyor 46.

The transverse-welding station 12 in FIG. 5 may serve to join the ends of rolls 14 and 14a in accurate correspondance with the pitch, or to cut defect portions out of a foil hose.

What is claimed is:

1. A method for joining a first tubular web and a second tubular web, each tubular web defining a plurality of bag portions having a predetermined pitch substantially defining a bag length and each tubular web having an end portion including at least one transverse weld, the method comprising the steps of:
   superimposing the transverse weld at the end portion of the first tubular web and the transverse weld at the end portion of the second tubular web, and
   joining the superimposed transverse welds by a joining weld, the joining weld being substantially coincident with the superimposed transverse welds,
   whereby the first tubular web and the second tubular web are joined to produce a joined tubular web having bag portions of substantially uninterrupted pitch.

2. A method according to claim 1, wherein the end portion of each tubular web further comprises an upper end transverse weld and an intermediate transverse weld, and wherein the step of superimposing the transverse welds further comprises the step of superimposing the intermediate transverse weld at the end portion of the first tubular web and the intermediate transverse weld at the end portion of the second tubular web.

3. A method according to claim 1 wherein at least one of the first and second tubular webs includes an imperfection and the method further comprises the step of removing the imperfection from the tubular web prior to the step of joining the superimposed transverse welds.

4. A device for joining a first tubular web and a second tubular web, each tubular web defining a plurality of bag portions having a predetermined pitch substantially defining a bag length and each tubular web having an end portion including at least one transverse weld, wherein the transverse weld at the end portion of the first tubular web and the transverse weld at the end portion of the second tubular web are superimposed, the device comprising:

joining means for joining the superimposed transverse welds by a joining weld, the joining weld being substantially coincident with the superimposed transverse welds, whereby the first tubular web and the second tubular web are joined to produce a joined tubular web having bag portions of substantially uninterrupted pitch and a transporting means for transporting the first tubular web and the second tubular web in a transport direction along a transport path, and wherein the joining means further comprises a transverse-welding station arranged at a position along the transport path.

5. A device according to claim 4, wherein the transverse-welding station further comprises two welding bars in staggered arrangement with respect to the transport direction of the first and second tubular web, and wherein at least one of the welding bars has an edge configured to cut at least one of the tubular webs.

6. A device as in claim 4, further comprising a bag making machine and a winding device and wherein the transverse-welding station is arranged between the bag making machine and the winding device.

7. A device according to claim 4, further comprising an unwinding device and a filling and closing device and wherein the transverse-welding station is arranged between the unwinding device and the filling and closing device.

* * * * *